United States Patent
Stevens

(10) Patent No.: US 7,481,447 B2
(45) Date of Patent: Jan. 27, 2009

(54) INITIATOR RETAINER

(75) Inventor: Bruce A. Stevens, Oakland, MI (US)

(73) Assignee: Automotive Systems Laboratory, Inc., Armada, MI (US)

(*) Notice: Subject to any disclaimer, the term of this patent is extended or adjusted under 35 U.S.C. 154(b) by 201 days.

(21) Appl. No.: 11/173,829

(22) Filed: Jul. 1, 2005

(65) Prior Publication Data

US 2006/0033317 A1    Feb. 16, 2006

Related U.S. Application Data

(60) Provisional application No. 60/585,226, filed on Jul. 3, 2004.

(51) Int. Cl.
*B60R 21/20* (2006.01)
(52) U.S. Cl. .............. 280/728.2; 411/521; 411/982
(58) Field of Classification Search ............. 280/728.2, 280/743.1; 102/275.12, 202.5, 202.12, 202.14; 403/329; 411/520, 521, 546, 547, 990, 966, 411/982
See application file for complete search history.

(56) References Cited

U.S. PATENT DOCUMENTS

| | | | | |
|---|---|---|---|---|
| 2,321,157 A | * | 6/1943 | Rees | 411/521 |
| 2,321,158 A | * | 6/1943 | Rees | 411/521 |
| 3,395,743 A | * | 8/1968 | Black | 411/118 |
| 5,492,366 A | | 2/1996 | Osborne et al. | 280/741 |
| 5,547,213 A | * | 8/1996 | Lang et al. | 280/728.2 |
| 5,553,886 A | * | 9/1996 | Gunn et al. | 280/728.2 |
| 5,645,298 A | | 7/1997 | Stevens et al. | 280/741 |
| 5,713,692 A | * | 2/1998 | McCarrick et al. | 403/329 |
| 6,056,314 A | * | 5/2000 | Shirk et al. | 280/728.2 |
| 6,168,202 B1 | * | 1/2001 | Stevens | 280/737 |
| 6,227,785 B1 | * | 5/2001 | Kilgore | 411/526 |
| 6,302,432 B1 | * | 10/2001 | Magoteaux et al. | 280/728.2 |
| 2005/0127649 A1 | * | 6/2005 | Smith | 280/741 |

* cited by examiner

*Primary Examiner*—John Q. Nguyen
*Assistant Examiner*—Drew J. Brown
(74) *Attorney, Agent, or Firm*—L.C. Begin & Associates, PLLC.

(57) ABSTRACT

A push-on retainer (16, 116) is provided for securing together an initiator (14) and another element of a gas generating system. The retainer (16, 116) includes a first portion (16a, 116a) for engaging a surface of the other element of the system, and a second portion (16b, 116b) coupled to the first portion for engaging a surface of the initiator (14) to secure the initiator to the other element of the gas generating system. A vehicle occupant protection system (180) is also provided which includes a gas generating system utilizing a push-on retainer (16, 116) for securing the initiator (14) to the other element of the gas generating system.

22 Claims, 5 Drawing Sheets

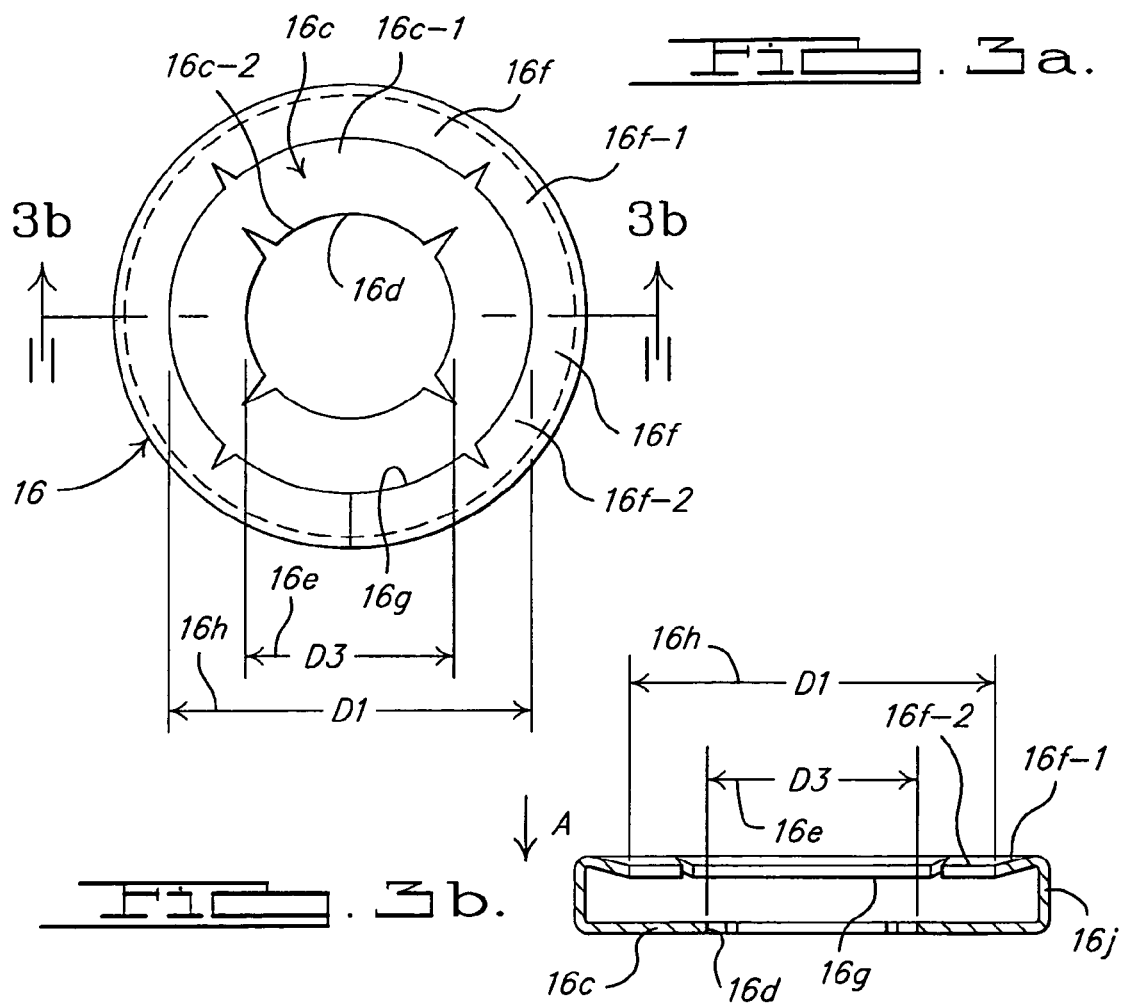
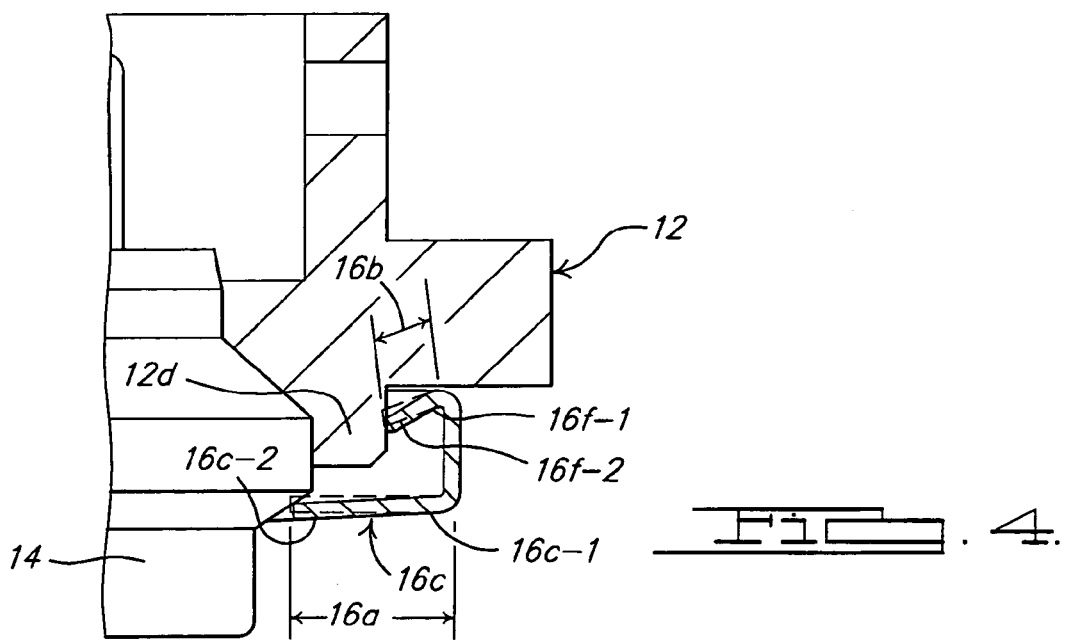

US 7,481,447 B2

INITIATOR RETAINER

CROSS REFERENCE TO RELATED APPLICATIONS

This application claims the benefit of provisional application Ser. No. 60/585,226, filed on Jul. 3, 2004.

BACKGROUND OF THE INVENTION

The present invention relates generally to gas generating systems and, more particularly, to gas generating systems for use in applications such as inflatable occupant protection systems in motor vehicles.

Gas generating systems for automotive applications typically employ an igniter or initiator for ignition of an associated gas generant composition positioned within the gas generating system. The initiator is secured to another element of the gas generating system, for example, a bore seal positioned to seal an end of the gas generating system housing. The initiator is conventionally secured to the bore seal using any one of a variety of methods, such as welding, adhesive application, crimping, or by integrally molding the initiator into the bore seal. However, these methods for securing the initiator to the bore seal increase the manufacturing cost and complexity of the gas generating system.

SUMMARY OF THE INVENTION

In accordance with the present invention, a push-on retainer is provided for securing an initiator to a bore seal or another element of a gas generating system. The retainer includes a first portion for engaging a surface of the bore seal, and a second portion coupled to the first portion for engaging a surface of the initiator to secure the initiator to the bore seal. A vehicle occupant protection system is also provided which includes a gas generating system utilizing a push-on retainer for securing the initiator to the bore seal or other element of the gas generating system.

BRIEF DESCRIPTION OF THE DRAWINGS

In the drawings illustrating embodiments of the present invention:

FIG. 3a is a plan view of the retainer embodiment shown in FIG. 1;

FIG. 3b is a cross-sectional side view of the retainer embodiment shown in FIG. 3a;

FIG. 4 is a partial cross-sectional side view of the assembled view shown in FIG. 2;

DETAILED DESCRIPTION

Figure 1:
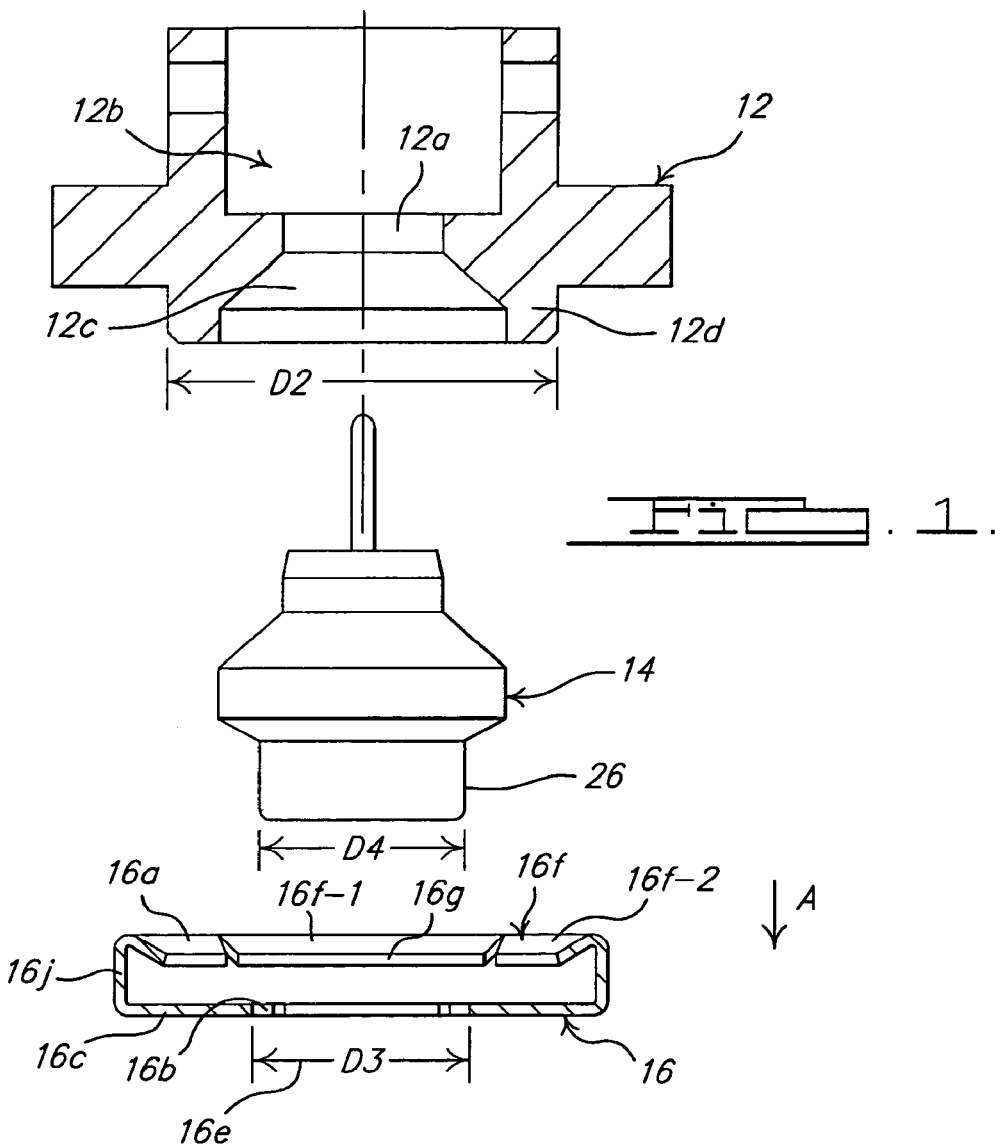
FIG. 1 is a cross-sectional exploded side view of an initiator assembly incorporating a first embodiment of a retainer in accordance with the present invention.
Figure 2:
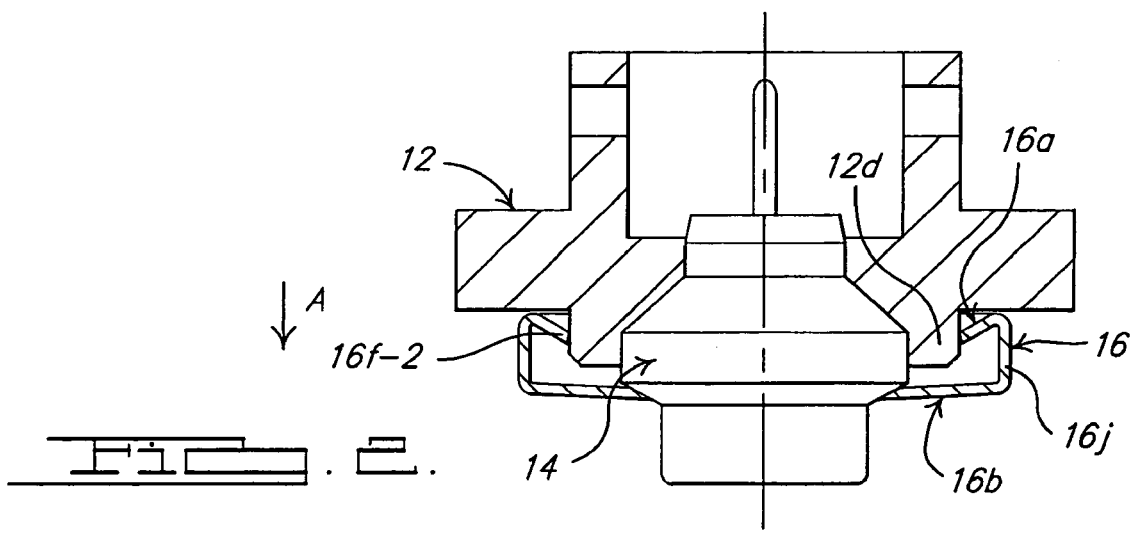
FIG. 2 is an assembled view of the initiator assembly of FIG. 1.
Figure 5:
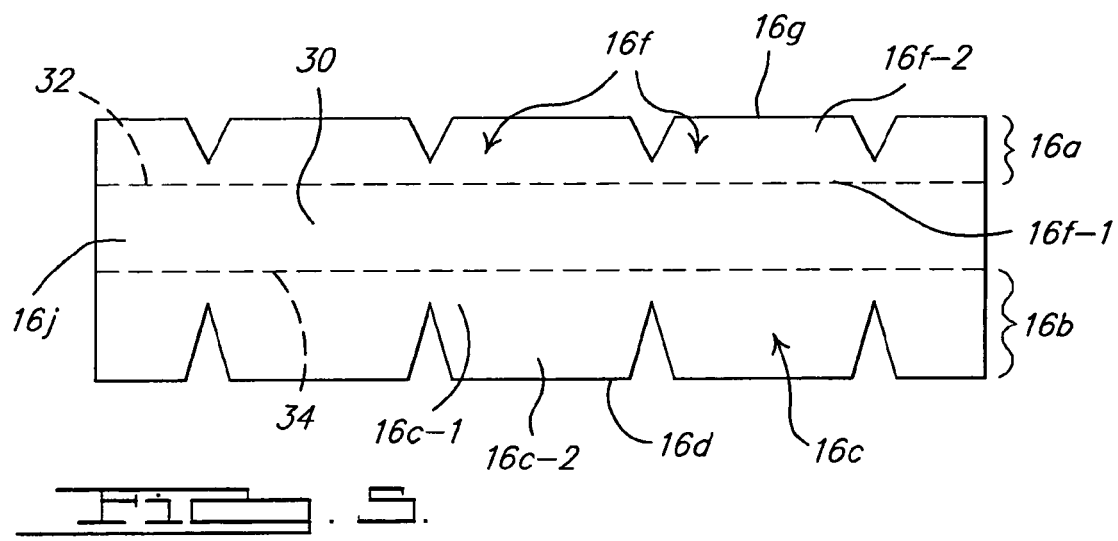
FIG. 5 is a plan view of one embodiment of a blank used to form the retainer embodiment shown in FIG. 1.
Figure 6:
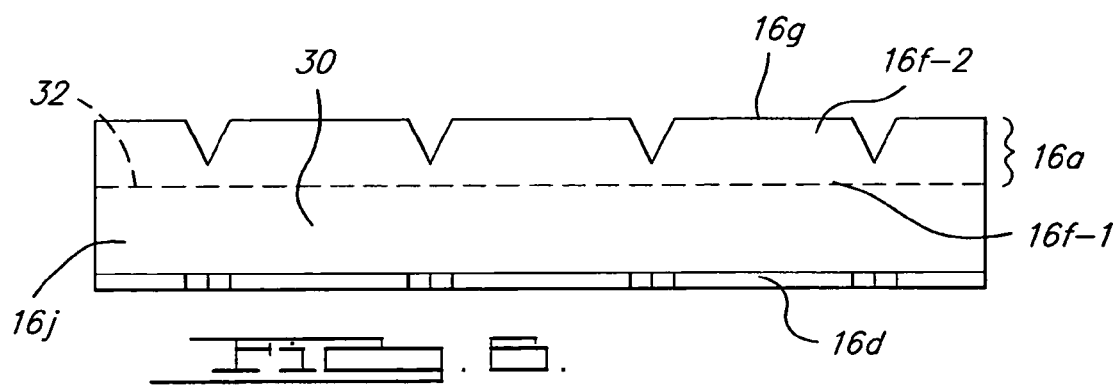
FIG. 6 is the view of FIG. 5 showing formation of a first plurality of blade portions in the blank.
Figure 7:
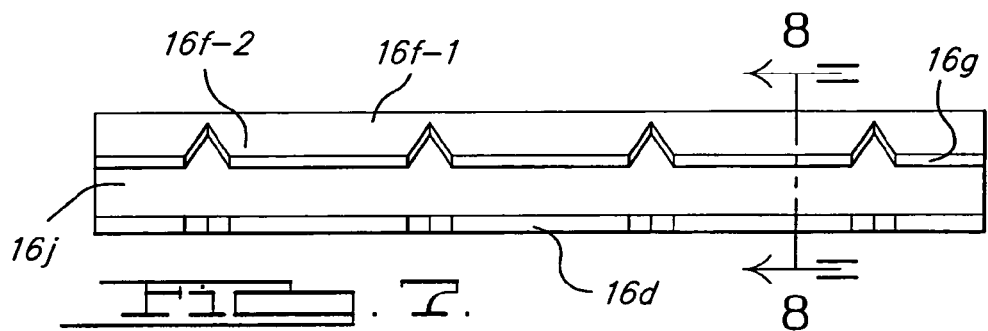
FIG. 7 is the view of FIG. 6 showing formation of a second plurality of blade portions in the blank.
Figure 8:
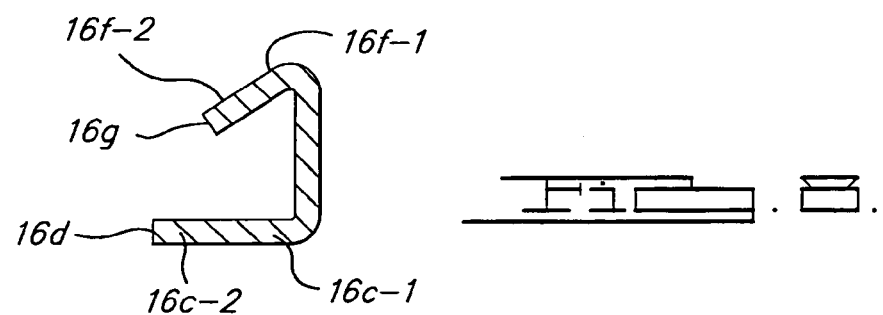
FIG. 8 is a cross-sectional side view of the blank shown in FIG. 7 showing the first and second pluralities of blade portions in the blank.

Referring to FIGS. 1 and 2, in a first embodiment, an end closure or bore seal 12 has a central orifice 12a for receiving therein a conventional initiator 14 for igniting an associated gas generant composition (not shown) stored in the gas generating system. Bore seal 12 also has a first annular region 12b containing the electrical connectors of the initiator for communication with an onboard crash sensor algorithm and associated equipment (not shown). An intermediate portion 12c of the bore seal has a female annular component that mates with outer contours of initiator 14 as the initiator is positioned within central orifice 12a. A rim 12d extends around an end portion of central orifice 12a to enclose a portion of initiator 14.

Referring again to FIGS. 1 and 2, initiator 14 is positioned and secured within bore seal central orifice 12a so as to enable fluid communication between the initiator and an associated gas generant composition (not shown) when the bore seal is secured to a housing or other portion of the gas generating system (not shown). Initiator 14 may be formed as known in the art. Exemplary initiator constructions are described in U.S. Pat. Nos. 6,009,809 and 5,934,705, incorporated herein by reference.

Referring again to FIGS. 1 and 2, a push-on retainer 16 is provided for securing initiator 14 within central orifice 12a of bore seal 12. Retainer 16 may be stamped and formed from a relatively hard metal material, such as stainless steel, carbon steel, or another ferrous alloy. Retainer 16 generally includes a first portion 16a for engaging a surface of bore seal 12 and a second portion 16b coupled to the first portion for engaging a surface of initiator 14 to secure the initiator to the bore seal.

Retainer first portion 16a is designed to engage bore seal 12 in an interference fit to secure the retainer to the bore seal. In the embodiments shown in FIGS. 1 and 2, the interference fit is effected by making retainer first portion 16a resiliently deflectable. Referring to FIGS. 1, 2, 3a, and 3b, retainer first portion 16a includes a plurality of first resiliently deflectable cantilevered blade portions 16f extending radially inwardly from a substantially fixed end 16f-1 to a substantially free end 16f-2 for engaging rim 12d of the bore seal. Blade portion free ends 16f-2 have edges 16g defining a first central retainer orifice 16h through which rim 12d of the bore seal 12 is received. First central retainer orifice 16h has a diameter D1 (FIGS. 3a, 3b) that is smaller than the diameter D2 of bore seal rim 12d (FIG. 1).

Retainer second portion 16b includes a plurality of second resiliently deflectable cantilevered blade portions 16c, each extending radially inwardly from a substantially fixed end 16c-1 to a substantially free end 16c-2 for engaging the initiator. Blade portion free ends 16c-2 have edges 16-d which combine to define a second central retainer orifice 16e through which initiator 14 is received. Second central retainer orifice 16e has a diameter D3 that is smaller than a diameter D4 (FIG. 1) of a cover 26 of the initiator.

Referring to FIGS. 1, 2, 3a, and 3b, retainer 16 is pressed onto bore seal rim 12d over initiator 14 with a portion of the initiator extending through retainer second central orifice 16e, causing blade portions 16c to abut and exert a spring force on initiator 14 in bore seal central orifice 12a, and causing blade portion free ends 16f-2 to engage bore seal rim 12d. The directions in which blade portions 16f extend enable the blade portions to flex in the direction indicated by arrow A during placement of the retainer onto bore seal rim 12d. The difference between diameter D2 of bore seal rim 12d and diameter D1 of retainer first central orifice 16h causes resilient blade portions 16f to deflect in the direction indicated by arrow A when retainer 16 is positioned onto bore seal 12, forming an interference fit between retainer 16 and bore seal 12 to secure the initiator to the bore seal. When the interference fit is formed, blade portions 16f abut bore seal rim 12d in a slightly deflected state. FIG. 4 is a partial cross-sectional view of the embodiment of the retainer shown in FIGS. 1, 2, 3a, and 3b mounted on a bore seal 12 to secure an initiator 14 therein. The dashed lines represent a cross-section of the retainer as formed, prior to its engagement with initiator 14 and bore seal 12. The solid lines represent the cross-section of the retainer when mounted to the bore seal.

To provide the maximum gripping force on bore seal 12 (thereby providing the maximum initiator retention force), it is generally preferable for retainer 16 to engage or grip bore seal 12 with a maximum total length of blade edge portion 16g. It is also desirable that cantilevered blade portions 12f engaging bore seal be relatively stiff (i.e., have a relatively high force-deflection coefficient.) These aspects may be achieved by providing a relatively small number of blade portions 12f with edge 12g of each blade portion 12f having the maximum available arc length, as shown in FIG. 3a. In addition, the gripping force applied to rim 12d and the spring force exerted on the initiator may be adjusted by suitable specification of material, material thickness, and the shapes of the various blade portions.

Referring to FIGS. 1, 2, 3a, and 3b, attempted removal of initiator 14 from bore seal central orifice 12a will cause the initiator to exert a force on retainer 16 in the direction of arrow A, producing a tendency for edges 16g of blade portions 16f to slide along rim 12d. In the embodiment shown in FIGS. 1, 2, 3a, and 3b, the surface of rim 12d contacted by blade portion edges 12g is formed from a material having a hardness that is less than the hardness of the retainer material, such that blade edges 12g penetrate the surface of rim 12d during attempted removal of the initiator, forming an indentation in the rim surface which impedes further motion of the blade edges along the rim. This aids in maintaining retainer 16 in engagement with rim 12d, thereby maintaining initiator 14 within bore seal central orifice 12a.

FIGS. 5-8 show one version of a stamped blank 30 used to form the retainer of FIG. 1. The embodiment of the retainer shown in FIG. 1 may be formed using any of a variety of known processes. In the example shown in FIGS. 5-8, a retainer blank 30 is stamped in the configuration shown in FIG. 5, producing blade portions 16f and blade portions 16c projecting from opposite sides of a connecting base portion 16j. Blank 30 may then be bent along line 34 to form second portion 16b of the retainer for engaging one or more surfaces of initiator 14 to secure the initiator in cavity 12a of bore seal 12. Blank 30 may then be bent along line 32 to form first portion 16a of retainer 16 for gripping bore seal rim 12d. Blade portions 16f are bent over such that, when retainer blank 30 is formed into a substantially circular configuration (FIG. 3a), blade portions 16f extend radially inwardly to define orifice 16h (FIGS. 3a, 3b) dimensioned to form an interference fit with rim 12d. The blank may then be rolled into the circular configuration shown in FIGS. 3a and 3b and secured in this configuration using, for example, a weld or a foldable tab.

Figure 9:
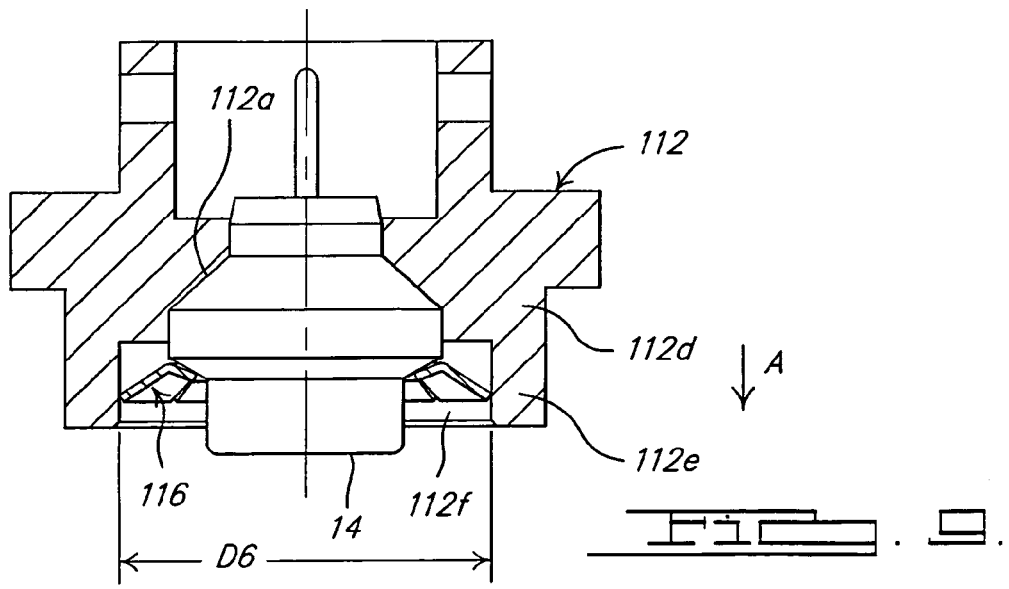
FIG. 9 is a cross-sectional side view of an initiator assembly incorporating a second embodiment of a retainer in accordance with the present invention.

FIG. 9 shows a second embodiment 112 of the bore seal. In FIG. 9, like numerals are used to identify features similar to those identified in FIG. 1. Referring to FIG. 9, in the second embodiment of the bore seal, a wall 112e extends from a rim 112d such that the rim and wall 112e define a cavity 112f enclosing a portion of initiator 14.

Figure 10:
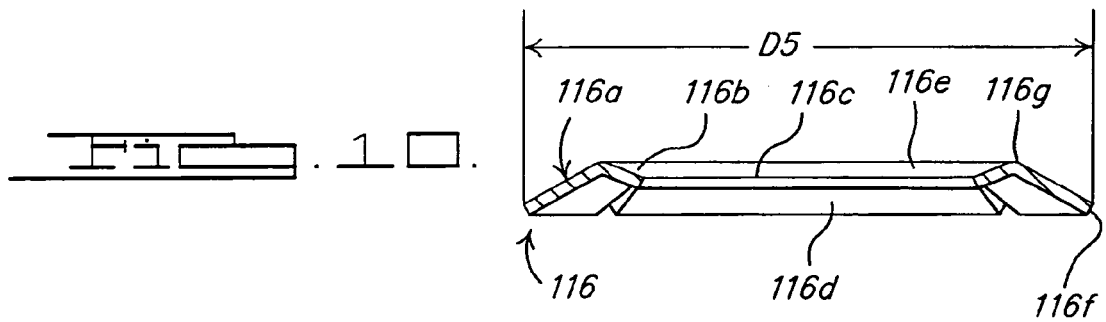
FIG. 10 is a cross-sectional side view of the retainer embodiment shown in FIG. 9.
Figure 11:
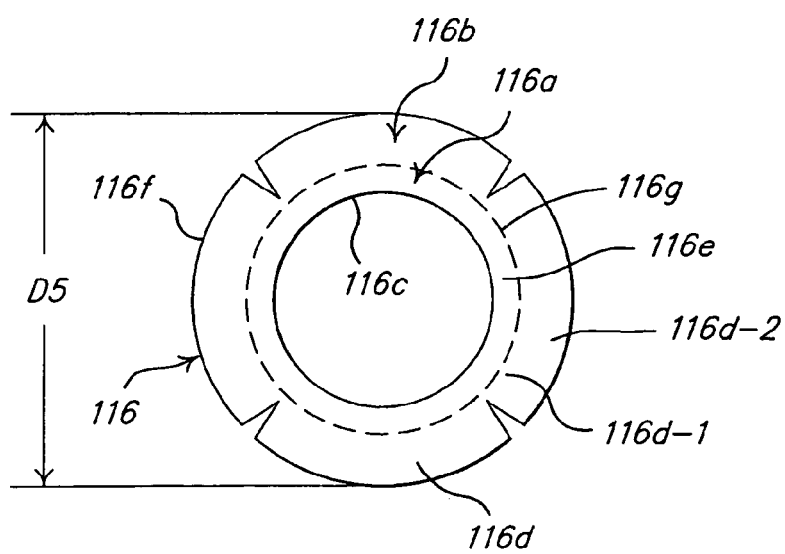
FIG. 11 is a plan view of the retainer embodiment shown in FIG. 9.

FIGS. 9-11 also show an alternative embodiment 116 of the retainer. As seen in FIGS. 9-11, retainer 116 includes a first portion 116a for engaging wall 112e and a second portion 116b for engaging initiator 14. Second portion 116b includes an annular rim 116e defining a central orifice 116c. First portion 116a includes a plurality of resiliently deflectable blade portions 116d distributed about the central orifice along rim 116e. Central orifice 116c is dimensioned to receive a portion of initiator 14 therethrough in a clearance fit.

Each of retainer blade portions 116d is a cantilevered blade portion extending radially outwardly from a substantially fixed end 116d-1 at rim 116e to a substantially free end 116d-2. Edges 116f of blade portion free ends 116d-2 collectively define a perimeter of the retainer having a diameter D5 larger than a diameter D6 of bore seal cavity 112f. A bend 116g is formed along rim 116e spaced radially outwardly from central orifice 116c such that blade portions 116d extend outside the plane of the portion of rim 116e defining central orifice 116c. The retainer embodiment of FIGS. 9-11 can be stamped, cut, and bent using known processes to provide the configuration shown.

In assembly, initiator 14 is positioned in central orifice 112a of bore seal 112 having the configuration shown in FIG. 9. Retainer 116 is then pressed into bore seal cavity 112f over initiator 14 with a portion of initiator 14 extending through retainer central orifice 116c, causing rim 116e to abut and support initiator 14, and causing blade portion free ends 116d-2 to engage bore seal wall 112e. The directions in which blade portions 112d extend enable the blade portions to flex in the direction indicated by arrow A (FIG. 9) during insertion of the retainer into bore seal cavity 112f. The difference between diameter D6 of bore seal cavity 112f and diameter D5 of the retainer perimeter causes resilient blade portions 112d to deflect in the direction indicated by arrow A when retainer 116 is inserted into cavity 112f, forming an interference fit between retainer 116 and bore seal 112 to secure the initiator to the bore seal. When the interference fit is formed, blade portions 112d reside within cavity 112f in a slightly deflected state.

Attempted removal of initiator 14 from bore seal central orifice 112a will cause the initiator to exert a force on retainer 116 in the direction of arrow A, producing a tendency for edges 116f of blade portions 116d to slide along wall 112e. As previously described with respect to the embodiment shown in FIG. 1, in the embodiment shown in FIG. 9 the surface of wall 112e contacted by blade portion edges 116f is formed from a material having a hardness that is less than the hardness of the retainer material, such that edges 116f penetrate the surface of wall 112e during attempted removal of the initiator, forming an indentation in the wall surface which impedes further motion of the edge along the wall. This aids in maintaining retainer 116 in engagement with rim 116e, thereby maintaining initiator 14 within bore seal central orifice 112a.

Bore seals 12, 112 may be stamped, die cast, or otherwise metal formed from a relatively soft metal, such as aluminum or another non-ferrous metal. Alternatively, bore seals 12, 112 may be molded from a polymer. In other embodiments (not shown), the bore seal may also be metal-formed from carbon steel, stainless steel, or another relatively hard metal, and then coated or overlaid with a material (for example, a polymer or an elastomeric material) that will permit respective edges 16*f*, 116*f* of retainer blade portions 16*d*, 116*d* to penetrate the coating during attempted removal of initiator 14 from respective bore seal central orifices 12*a*, 112*a*, thereby preventing further motion of the retainer edges relative to the coated surface and preventing withdrawal of the initiator from bore seal central orifices 12, 112*a*. The coating or overlay may be applied locally to bore seal surfaces in contact with retainer first portion 12*a*, 112*a*, or the coating may be applied to the entire surface of the bore seal.

Although the retainer of the present invention is shown securing an initiator to a bore seal of a gas generating system, the invention is not limited thereto. With minor variations, a retainer as described herein may be used to secure an initiator to any one of various other gas-generating system components. Similarly, a retainer as described herein may be adapted to secure together other components (i.e., components other than an initiator and/or bore seal) of the gas generating system.

The gas generating system may contain an inflator or gas generator as known in the art. Accordingly, gas generators that function as airbag inflators, seatbelt pretensioners, airbelt inflators, and other safety applications are included within the broader term gas generating system. Typical gas generators and seat belt pretensioners include those exemplified in U.S. Pat. Nos. 5,944,343, 6,422,601, 6,419,177, and 6,805,377, herein incorporated by reference. Gas generant compositions typically employed in known gas generators include those described in U.S. Pat. Nos. 5,035,757, 5,872,329, and 6,210, 505, herein incorporated by reference. These gas generators are schematically exemplified in FIG. 12 as reference numbers 210 and 156, and include initiators and initiator retainers as described herein.

Figure 12:
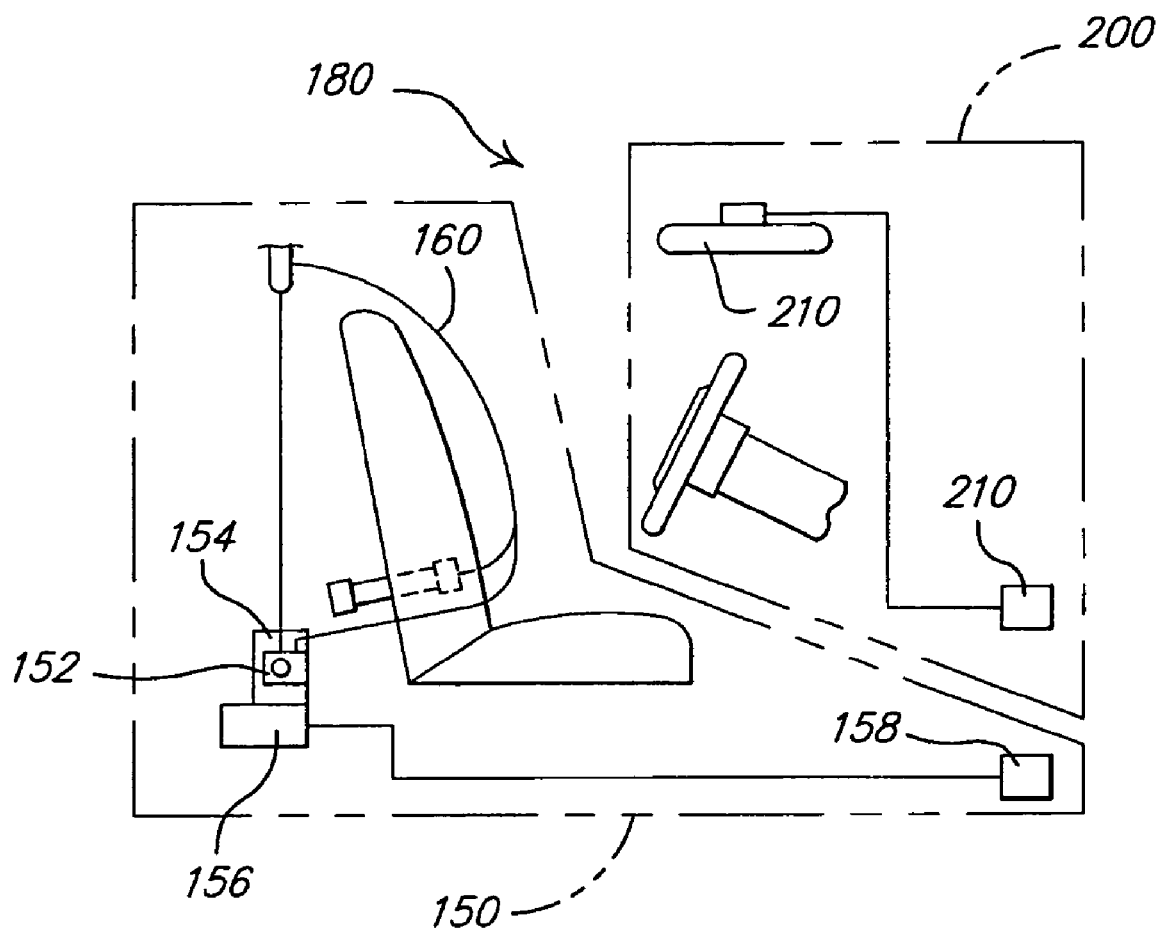
FIG. 12 is a schematic representation of an exemplary vehicle occupant protection system incorporating a gas generating system utilizing an initiator retainer in accordance with the present invention.

Referring to FIG. 12, in a particular application, an embodiment of the gas generating system described above is incorporated into an airbag system 200 in a passenger vehicle. Airbag system 200 includes at least one airbag (not shown) and a gas generator or gas generating system 210 incorporating an embodiment of the initiator retainer described herein. The gas generating system 210 is coupled to the airbag so as to enable fluid communication with an interior of the airbag upon activation of the airbag system. Airbag system 200 may also be in communication with a known crash event sensor 210 that is in operative communication with a known crash sensor algorithm (not shown) which signals actuation of airbag system 200 via, for example, activation of igniter 14 (not shown in FIG. 12) in the event of a collision.

Referring again to FIG. 12, a gas generating system or an airbag system including a gas generating system utilizing an embodiment of the initiator retainer may be incorporated into a broader, more comprehensive vehicle occupant protection system 180 including additional elements such as a safety belt assembly. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 incorporating a gas generator and an initiator retainer of the present invention may be coupled to belt retractor mechanism 154 to actuate the retractor mechanism in the event of a collision. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference. Safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177 provide illustrative examples of pretensioners actuated in such a manner.

It will be appreciated that the various constituents described above are formed in known manners. It will also be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

The invention claimed is:

1. A push-on retainer for securing together first and second elements of a gas generating system, the retainer comprising:
   first means for engaging a surface of the first element during application of the retainer to the first element in a first direction; and
   second means coupled to the first means, for engaging a surface of the second element during application of the retainer to the first element in the first direction, such that the second element is secured to the first element so as to impede motion of the second element in a second direction substantially opposite the first direction,
   wherein the second element is positioned within an internal cavity formed in the first element and the surface of the first element is located outside the internal cavity.

2. The push-on retainer of claim 1 wherein said first element is a bore seal and said second element is an initiator.

3. The retainer of claim 1 wherein the first means engages the first element in an interference fit.

4. The retainer of claim 3 wherein the second means engages the second element in an interference fit 5. The retainer of claim 1 wherein the surface of the first element is formed from a material having a first hardness, the first means of the retainer is formed from a material having a second hardness, and the second hardness is greater than the first hardness.

6. The retainer of claim 5 wherein, during attempted separation of the first and second elements, an edge of the first means penetrates the surface of the first element to form a surface indentation in the first element, thereby impeding further motion of the edge along the surface of the first element.

7. The retainer of claim 6 wherein the first means comprises a plurality of resilient blade portions.

8. The retainer of claim 1 wherein the first means of the retainer is resiliently deflectable.

9. The retainer of claim 1 wherein the retainer has a central orifice and a plurality of resilient blade portions distributed about the central orifice.

10. The retainer of claim 1 wherein the second means of the retainer is resiliently deflectable.

11. The retainer of claim 1 wherein the retainer has an annular structure including a plurality of radially extending resilient blade portions.

12. The retainer of claim 11 wherein each blade portion of the plurality of blade portions is a cantilevered blade portion extending from a substantially fixed end to a substantially free end.

13. The retainer of claim 12 wherein the substantially free ends of the blade portions define an orifice dimensioned to form an interference fit with the first element of the gas generating system.

14. The retainer of claim 12 wherein the substantially free ends of the blade portions define a perimeter of the retainer dimensioned to form an interference fit wit the first element of the gas generating system.

15. The retainer of claim 12 wherein each blade portion of the plurality of blade portions extends radially inwardly from the substantially fixed end to the substantially free end.

16. A vehicle occupant protection system comprising:
    an inflatable vehicle occupant protection device; and
    a gas generating system for providing inflation gas to the inflatable device, the gas generating system including a push-on retainer in accordance with claim 1.

17. The vehicle occupant protection system of claim 16 wherein the inflatable device is an airbag.

18. The vehicle occupant protection system of claim 16 wherein the inflatable device is a safety belt.

19. The vehicle occupant protection system of claim 16 wherein said first element is a bore seal and said second element is an initiator.

20. The retainer of claim 1 wherein the second element is positioned along an axis of the first element, and wherein the retainer secures the second element to the first element such that motion of the second element along the axis is impeded.

21. A push-on retainer for securing together first and second elements of a gas generating system, the retainer comprising:
    first means for engaging a surface of the first element during application of the retainer to the first element in a first direction; and
    second means coupled to the first means, for engaging a surface of the second element during application of the retainer to the first element in the first direction, such that the second element is secured to the first element so as to impede motion of the second element in a second direction substantially opposite the first direction,
    wherein the second element is positioned within an internal cavity formed in the first element and the surface of the first element is located inside the internal cavity.

22. An initiator assembly for a gas generating system, the initiator assembly comprising:
    a bore seal;
    an initiator positioned within the bore seal; and
    a retainer including a first plurality of cantilevered engagement members engaging a respective one of the bore seal and the initiator, and a second plurality of cantilevered engagement members engaging the other one of the bore seal and the initiator, each engagement member of the first plurality of engagement members and the second plurality of engagement members extending radially inwardly from a substantially fixed end to a substantially free end.

* * * * *

UNITED STATES PATENT AND TRADEMARK OFFICE
CERTIFICATE OF CORRECTION

| | | |
|---|---|---|
| PATENT NO. | : 7,481,447 B2 | Page 1 of 1 |
| APPLICATION NO. | : 11/173829 | |
| DATED | : January 27, 2009 | |
| INVENTOR(S) | : Stevens | |

It is certified that error appears in the above-identified patent and that said Letters Patent is hereby corrected as shown below:

Column 3; Line 25; delete "12f" and insert --16f--

Column 3; Line 29; delete "12f" and insert --16f--

Column 3; Line 29; delete "12g" and insert --16g--

Column 3; Line 29; delete "12f" and insert --16f--

Column 3; Line 41; delete "12g" and insert --16g--

Column 3; Line 43; delete "12g" and insert --16g--

Signed and Sealed this

Twenty-fourth Day of March, 2009

JOHN DOLL
*Acting Director of the United States Patent and Trademark Office*